United States Patent [19]

Niaura et al.

[11] Patent Number: 5,032,416
[45] Date of Patent: Jul. 16, 1991

[54] METHOD FOR PRODUCING A FOOD BODY WITH SURFACE COLOR INDICIA

[75] Inventors: Vitas Niaura, Western Springs; Jeffery A. Oxley, Naperville, both of Ill.; Elio E. Tarika, New Canaan, Conn.

[73] Assignee: Viskase Corporation, Chicago, Ill.

[21] Appl. No.: 574,971

[22] Filed: Aug. 30, 1990

Related U.S. Application Data

[60] Division of Ser. No. 326,560, Mar. 24, 1989, Pat. No. 4,985,260, which is a continuation-in-part of Ser. No. 191,100, May 6, 1988.

[51] Int. Cl.$^5$ .......................... A23L 1/275; A23P 1/08
[52] U.S. Cl. ........................................ 426/383; 426/87; 426/105
[58] Field of Search ..................... 427/146, 148, 149; 426/87, 383, 105, 125, 138

[56] References Cited

U.S. PATENT DOCUMENTS 2,008,018  7/1935  Hemming .
2,185,125  12/1939  Coleman .......................... 427/258
2,301,564  11/1942  Menges .
3,539,361  11/1970  Coleman .

FOREIGN PATENT DOCUMENTS 713510   7/1965  Canada .
61-13790  4/1986  Japan .

OTHER PUBLICATIONS

"Flexography Principles and Practices", 3rd edition, published by Flexographic Technical Association, Inc. pp. 251-252 (1980).

Primary Examiner—Donald E. Czaja
Assistant Examiner—D. Workman
Attorney, Agent, or Firm—John C. LeFever

[57] ABSTRACT

An article comprising a substrate such as cellulose casing having thereon a desired indicia such as grill marks or a corporate logo, which in turn comprises a water soluble underlayer such as caramel and a water insoluble binder-sealant layer such as shellac. Also included are an indicia-containing processable food package, a method for preparing the substrate-indicia article, a method for making an indicia-containing food product, and an edible food product as for example a frankfurter having a desired indicia on its outer surface.

27 Claims, 2 Drawing Sheets

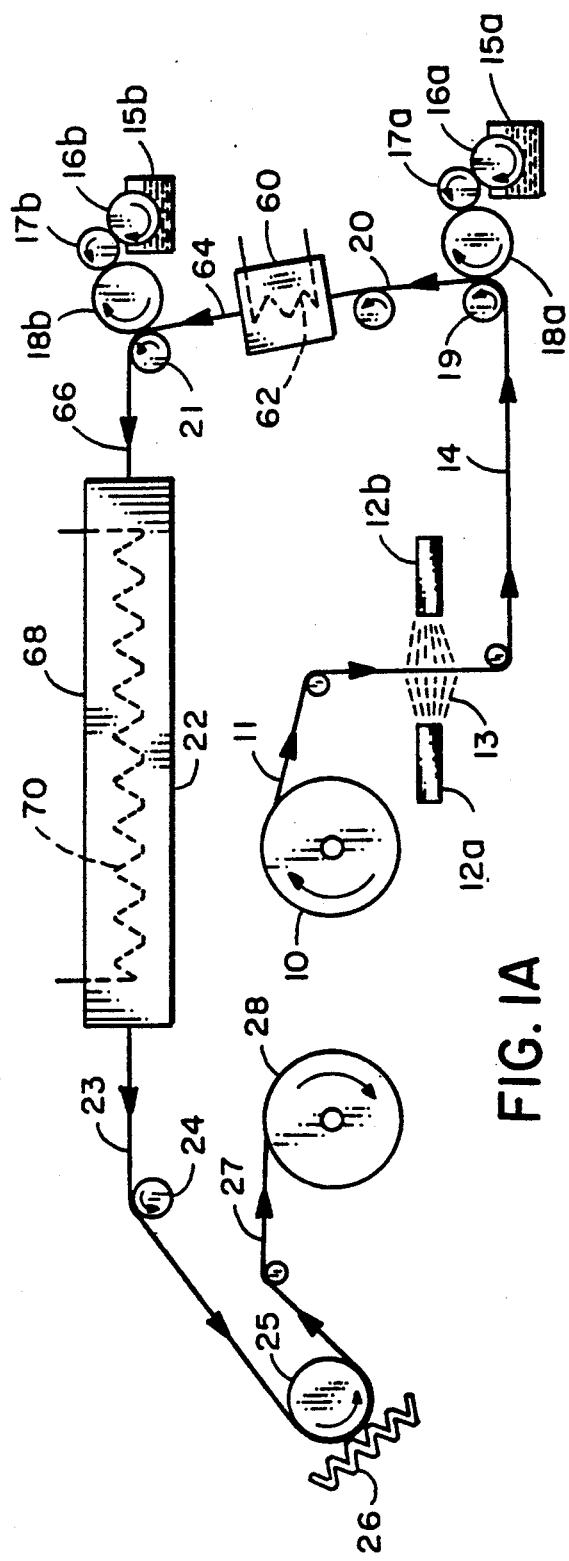
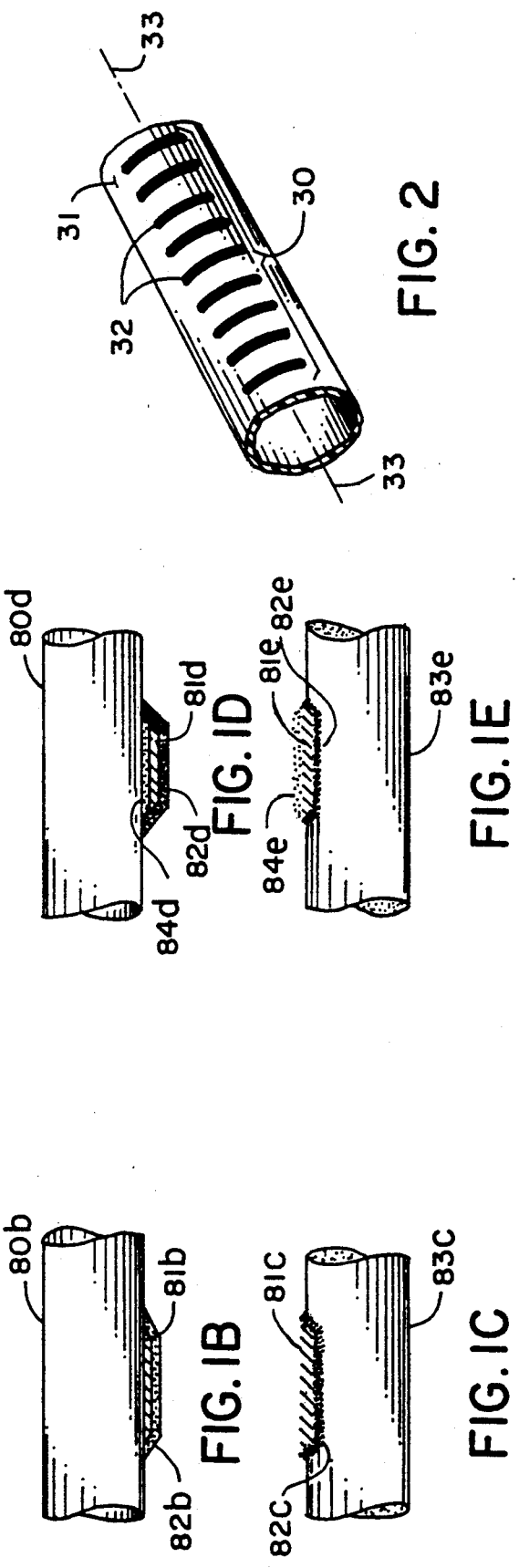

METHOD FOR PRODUCING A FOOD BODY WITH SURFACE COLOR INDICIA

RELATED APPLICATION

This application is a division of prior U.S. application Ser. No. 326,560, filed Mar. 24, 1989, now U.S. Pat. No. 4,985,260, which is a continuation-in-part of application Ser. No. 191,100, filed May 6, 1988.

TECHNICAL FIELD

This invention relates to an article having thereon a desired indicia of organic coloring matter as for example a cellulosic food casing with the organic color indicia on its surface, a processable food package comprising an indicia-containing casing filled with processable food to which the color indicia is transferred during processing, an edible food product with the color indicia on its outer surface as for example processed frankfurter with grill marks, and a method for making the indicia-containing processed food product.

BACKGROUND OF THE INVENTION

As used herein, "indicia" means a distinctive predetermined pattern which the manufacturer of an edible product wishes to have applied on the outer surface of a food product. Indicia includes "logo" which is an intelligible Pattern as for example one or more letters, pictures or symbols. Indicia also includes marks which have a pleasing connotation to the consumer, as for example grill marks.

There is a long-standing need for an edible food product with a desired indicia on its outer surface. For example, food processors would like to have their edible product identified by their company logo to indicate high and consistent quality. Also, other types of indicia such as grill marks on frankfurters are desirable for esthetic reasons.

Frankfurters are prepared by processing of moist emulsion at elevated temperature and in a moist environment inside casing, usually manufactured from cellulose, i.e. cellulosic casings. The latter are typically supplied to the food processor in the form of shirred sticks, i.e. highly compressed pleats which may be on the order of 1/150 of their as-manufactured flat length. The shirred stick with one closed end is attached to a stuffing machine which deshirrs and deplugs the closed end of the stick whereupon emulsion is pumped into and fills the casing. The emulsion-filled casing is formed into short links and at high speed, e.g. 250 fpm as it is removed from the stuffing machine. The emulsion is cooked within the casing during the processing step to form a frankfurter. After processing, the cellulosic casing is peeled from the frankfurter outer surface using high speed equipment, e.g. 500 fpm, and the casing is discarded.

For high speed production, the moisture content of the cellulosic casing must be closely maintained during both the shirring and the stuffing steps. This is necessary so that the casing has the necessary flexibility for moving without breakage yet adequate physical integrity for mechanical handling during deshirring and stuffing. Plasticizers such as glycerine are also included in the casing to partially satisfy these requirements.

Those skilled in the food processing art recognize that it is not commercially practical to impart color indicia on frankfurters after processing and casing removal. The prior art has proposed this be done for example by searing the frankfurter to form grill marks, as taught in U.S. Pat. No. 4,384,006. One problem with this approach is the need for additional and complex high speed machinery to match the frankfurter production rate. Another problem is that searing requires penetration of the thin outer skin of the frankfurter, thereby creating a sanitation issue.

Another approach to providing an edible food body outer surface with color indicia is to form the indicia on the cellulosic substrate and then transfer the indicia to the food body outer surface during processing. There are a number of problems to this approach which have not been collectively overcome. The indicia must be formed of material which has been approved by governmental authorities for direct contact with food, and this requirement severely restricts the selection of constituents. Further, the indicia as applied to the substrate should have at least some degree of abrasion resistance. If for example the indicia-containing substrate is food casing to be shirred, the indicia must retain its integrity during extreme distortions of the substrate which are characteristic of the pleat-forming and compression steps of shirring, as well as pleat elimination and straightening out of the casing during the succeeding inflation and stuffing. Even if the casing is not shirred but instead rolled and fed to the stuffing machine as roll stock, there is considerable distortion by virtue of the bending and compression of the casing to form roll stock.

A further requirement is that the indicia must not cause transfer ("ink-offsetting") or even "blocking" during handling or storage of indicia-containing substrate, i.e. transfer or even adhesion to either the substrate or another indicia when different substrate portions are pressed together as for example in shirring, rolling or stacking.

Another requirement of any food casing color indicia system is that the indicia must have at least some degree of moisture insensitivity. That is, the color indicia is preferably insoluble in water at ambient temperature because the casing itself must contain substantial moisture in the as-manufactured condition, as previously explained. If shirring is to be employed, the casing is further moisturized during shirring. A color indicia which is even partially soluble in water would smear and could not transfer as a clearly defined sharp indicia.

Still another requirement of a food casing color indicia system is that the indicia must substantially completely transfer to the contiguous edible surface with sharp definition. Less than complete transfer would result in an indicia which has poor definition, unevenness or be too faint when compared with the surrounding surface. This occurs when one attempts to pass color indicia through the casing wall in the presence of moisture (from the outer surface to the inner surface) to the sausage during stuffing, as described in U.S. Pat. No. 2,301,564.

Color indicia may possibly be formed from dyes or pigments, but there are serious limitations with each approach. Water soluble dyes are extremely moisture sensitive, i.e. they tend to run away from the as-applied indicia leaving at best a fainter mark with poor definition. Solvent soluble dyes are not moisture sensitive but are not approved by governmental authorities for human consumption. On the other hand, organic pigments are unavailable in certain colors as for example brown, and in general are not approved by governmental authorities for human consumption.

An object of this invention is to provide an article comprising a substrate with a desired color indicia thereon which is approved for direct contact with food, moisture insensitive, and which is substantially completely transferable from the substrate to a contiguous edible surface.

Another object is to provide a processable food package comprising a casing filled with processable food in direct contact with the casing inner surface, the latter having thereon a desired color indicia which is substantially completely transferable from the the casing inner surface to the food outer surface during in-situ processing of the food.

A further object is to provide an edible food product having on its outer surface a desired color indicia.

A still further object is to provide a method for making processed food product in which a casing with a desired color indicia on its inner surface is stuffed with a processable food mass, the color indicia is substantially completely transferred to the food mass outer surface during food processing and the casing is thereafter removed from the processed food mass without loss of the color indicia on the food mass outer surface.

Other objects and advantages of this situation will be apparent from the ensuing disclosure and appended claims.

SUMMARY OF INVENTION

One aspect of this invention is an article comprising a substrate (for example plasticized cellulose or thermoplastic film) having thereon a desired indicia comprising a water soluble dry colorant under layer in nondiffusible association with said substrate and a binder-sealant layer superimposed over and entirely enclosing the colorant layer top surface in adhering relationship, the binder-sealant perimeter outwardly extending beyond the colorant layer extremities so as to directly contact the surrounding substrate in adhering relationship therewith, said binder-sealant having a melting point above about 100° F. and being water insoluble. The binder-sealant covered colorant indicia is substantially completely transferable from the substrate to a contiguous edible surface in the presence of moisture.

In this article, the bottom surface of the colorant layer may be in contiguous association with the substrate. Alternatively, a first binder-sealant layer may have its bottom surface adhered to the substrate with the under surface of the colorant layer superimposed on the top surface of the first binder-sealant in adhering and nondiffusible relationship therewith. A second binder-sealant layer comprises the aforementioned binder-sealant superimposed over the colorant layer. The outer perimeter of at least one of the first and second binder-sealant layers outwardly extends beyond the colorant layer extremities for direct contact with the surrounding substrate. The first binder-sealant also has a melting point above about 100° F. and is water insoluble. The first binder-sealant and the second binder-sealant may be formed of identical or different materials.

Another aspect of this invention is a processable food package comprising a casing or tube filled with water moisture-containing processable food having its outer surface in direct contact with the casing inner surface. The latter is a substrate for the aforedescribed indicia, and the binder-sealant top surface is in contiguous association with the food outer surface. Preferably the casing is either cellulosic or formed from thermoplastic film. The indicia is substantially completely transferable from the casing inner surface to the water moisturized food outer surface during processing thereof in the casing. The bottom surface of the colorant layer may be in contiguous association with the substrate. Alternatively, a first binder-sealant layer may have its bottom surface adhered to the substrate, and the under surface of the colorant layer is superimposed on the top surface of the first binder-sealant layer in adhering and nondiffusible relationship therewith. In this sandwich embodiment of the article, a second binder-sealant layer comprises the aforementioned binder-sealant superimposed over the colorant layer. The first binder-sealant also has a melting point above about 100° F. and is water insoluble.

Still another aspect of this invention is a method for preparing an indicia-containing substrate flexible article. A plasticized substrate is provided, and a portion of a desired indicia is applied thereto comprising a water soluble colorant layer with its bottom surface in contiguous and nondiffusible association with the substrate. At least the applied colorant indicia portion is dried, and a mixture comprising a binder sealant and organic solvent mixture coating is applied as another indicia portion over the dry colorant layer top surface to entirely enclose same. The coating perimeter extends outwardly beyond the colorant layer extremities so as to directly contact the substrate. The binder-sealant has a melting point above about 100° F. and is water insoluble. The organic solvent is evaporated from the coating so as to form a dry binder-sealant coating entirely enclosing the dry colorant layer top surface and being adhered thereto and the surrounding substrate.

A further inventive method for preparing an indicia-containing substrate flexible article includes the step of applying as a portion of a desired indicia to the substrate, a water insoluble first binder-sealant and organic solvent mixture as a coating. The organic solvent is evaporated from the coating to form a dry layer with its bottom surface adhered to the substrate. Another portion of the indicia is applied from an aqueous solution, comprising a water soluble colorant layer with its under surface superimposed on the top surface of the dry first binder-sealant layer. The so-applied colorant layer is dried so as to be in adhering and nondiffusible relationship with the first binder-sealant. Next a water insoluble second binder-sealant and organic solvent mixture coating is applied as still another portion of the indicia. This coating is applied over the colorant layer top surface and extends beyond the colorant layer extremities so as to entirely enclose same. At least one of the first and second sealant-binder perimeters extends outwardly beyond the colorant layer extremities so as to directly contact the substrate surrounding surface. The organic solvent is then evaporated from the last-mentioned coating to form a second binder-sealant dry coating entirely enclosing the dry colorant layer top surface, being adhered thereto and the surrounding substrate. The first binder-sealant, colorant, second binder-sealant sandwich indicia is substantially completely transferable from the substrate to a contiguous edible surface in the presence of moisture.

A still further aspect of the invention is a method for making an indicia-containing processed food product as for example frankfurter having spaced grill-like marks on its surface. In this method a casing article is provided having an plasticized flexible inner surface with a water soluble dry colorant layer having its bottom surface in nondiffusible association with the casing and a water insoluble binder-sealant superimposed over and entirely enclosing the colorant top surface in adhering relationship as a desired indicia. The binder-sealant perimeter extends outwardly beyond the colorant layer extremities so as to directly contact the surrounding casing inner surface in adhering relationship. In this method, the casing is filled with water moisturized processable food such that the water moisturized food outer surface is in direct contact with the binder-sealant on the casing inner surface. The food-containing casing is processed at elevated temperature to cook the food and simultaneously substantially completely transfer the binder-sealant covered colorant indicia from the casing inner surface to the water moisturized processed food outer surface. The casing article is then peeled from the indicia- containing processed food outer surface In a preferred embodiment of this method the indicia is bonded to the casing outer surface and the casing article is thereafter inverted to position the indicia on the casing inner surface prior to filling same with food.

An additional aspect of the invention is an edible food product comprising a processed food body having on its outer surface a desired indicia of a water insoluble binder-sealant layer and a water soluble colorant layer. The inner surface of the binder-sealant layer is bonded to the food body outer surface and the colorant is adhered to the outer surface of the binder-sealant. The latter has a melting point above about 100° F.

The invention also contemplates an edible food product comprising a processed food body having on its outer surface a desired indicia sandwich. The latter includes a water insoluble first binder-sealant layer, a water soluble colorant layer and a water insoluble second binder-sealant layer. The top surface of the latter is adhered to the food body outer surface, the upper surface of the colorant layer is adhered to the second binder-sealant layer bottom surface, and the top surface of the first binder-sealant layer is adhered to the colorant layer under surface.

In the drawings:

FIG. 1A is a schematic representation of a flexographic system suitable for bonding indicia on the outer surface of a substrate as for example flattened cellulosic casing.

FIG. 1B is a schematic enlarged cross-sectional elevation view of an embodiment of the inventive article comprising a cellulose substrate and dry colorant under layer-binder sealant cover layer indicia.

FIG. 1C is a schematic enlarged cross sectional elevation view of an edible food product to which the FIG. 1B indicia has been transferred, comprising a processed food body having on its outer surface an indicia comprising a binder-sealant under layer and colorant top layer.

FIG. 1D is a schematic enlarged cross-sectional elevation view of another embodiment of the invention article comprising a cellulose substrate and an indicia sandwich of a first binder-sealant layer, dry colorant layer and second binder-sealant layer.

FIG. 1E is a schematic enlarged cross-sectional elevation view of an edible food product to which the FIG. 1D indicia has been transferred, comprising a processed food body having on its outer surface an indicia sandwich comprising a second binder-sealant layer, a dry colorant layer and a first binder-sealant top layer.

FIG. 2 is an inflated cellulose food casing substrate having spaced indicia on its outer surface in the form of grill marks.

DETAILED DESCRIPTION

Figure 3:
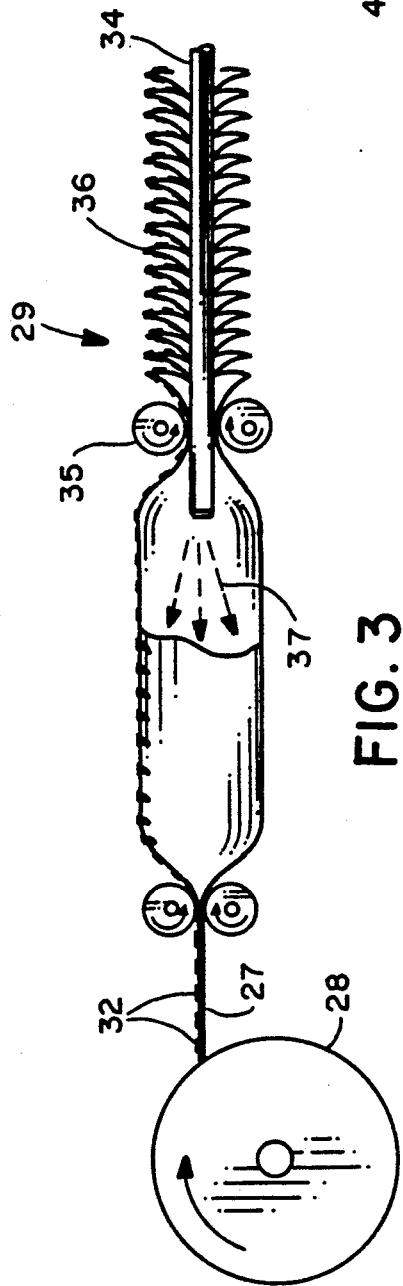
FIG. 3 is a schematic representation of a system for shirring the indicia-containing cellulose casing article of FIG. 2 with the indicia on the casing outside surface.

The preferred substrate of this invention is cellulosic food casing prepared by the well known viscose-xanthation process. In the latter, high quality relatively pure cellulose pulp (either cotton or wood) is first converted to alkali cellulose by steeping in a sodium hydroxide solution, dried and shredded. After a preferred aging step, xanthation—the conversion of alkali cellulose to xanthate cellulose—is accomplished by reaction with carbon disulfide. The purpose of xanthation is to enable dispersion of the cellulose in a dilute solution of sodium hydroxide. This is the viscose formation step in which sodium hydroxide is absorbed onto the xanthate cellulose which becomes highly swollen and dissolves over a finite time period. Viscose is essentially a solution of cellulose xanthate in a solution by sodium hydroxide which has been aged to a specific degree of precipitability.

To form a casing the viscose is extruded into a tubular cellulose film, which is converted to cellulose in the extrusion bath by action of acid-salt, for example sulphuric acid and sodium sulphate. The resulting cellulose casing is preferably passed through several dilute acid baths to insure completion of the regeneration and to further remove water.

The casing may also be reinforced, as for example by paper, commonly referred to as "fibrous" casing. This may be accomplished by coating the viscose on one or both sides of a paper sheet prior to extrusion.

The cellulose casing substrate embodiment of the present invention may also contain other ingredients which are conventionally used, e.g. glycerine and/or propylene glycol as humectants or softening agents. Agents for improving the peelability of the casings from food products may be optionally coated on the food contacting surface, as for example carboxymethyl cellulose and other water soluble cellulose ethers as described in U.S. Pat. No. 3,898,348. Other suitable peeling aids include "Aquapel", a Hercules, Inc. trademarked product comprising alkyl ketene dimers, the use of which is described in U.S. Pat. No. 3,905,397, and "Quilon", a DuPont Company trademarked product comprising fatty acid chromyl chlorides the use of which is described in U.S. Pat. No. 2,901,358.

Liquid smoke may be added to the casing substrate embodiment for color and flavor transfer to the food product during processing. This treatment may be with "as-is" tar-containing liquid smoke as for example described in U.S. Pat. No. 4,377,187 or with tar-depleted liquid smoke as for example described in U.S. Pat. No. 4,492,918. In this embodiment the indicia may be applied to the casing substrate either before or after the liquid smoke treatment.

For practicing this invention in connection with food casings as the indicia substrate, the invention of copending U.S. patent application Ser. No. 07/191100 filed May 6, 1988 in the names of J. A. Oxley and M. D. Nicholson is preferably employed. In this respect, one surface of the casing is provided with an indicia and during stuffing, the casing surface carrying the indicia is brought into direct contact with the edible product stuffed into the casing. The indicia releases from the casing surface and transfers to the surface of the food product so that after stuffing and processing a mirror image of the indicia remains on the surface of the edible product when the casing is removed. In those instances where the indicia is not identical in the reversed form, the indicia applied to the casing substrate should be in mirror image to the indicia desired on the surface of the edible product.

Casing processing and shirring operations performed after application of the indicia material to the casing should not smear or distort the indicia. Otherwise, the indicia, when transferred to the processed edible product, is blurred and/or distorted. Application of the indicia material is most easily accomplished by passing the casing through an applicator which prints or otherwise applies a mirror image of the desired indicia or pattern onto the surface of the casing.

Preferably the indicia is applied to the outer surface of the casing. Thereafter, the casing is turned inside out so the indicia is on the inside or edible contacting surface. Inverting the casing can be accomplished prior to stuffing or during stuffing. U.S. Pat. No. 4,162,557 discloses a method for inverting casing prior to stuffing whereas U.S. Pat. No. 4,162,693 discloses a method for inverting casing during stuffing. Both of these patents are incorporated herein by reference.

The casing can be shirred in a conventional manner with the indicia on the exterior surface of the casing. If this is done, the casing may be inverted during stuffing to place the indicia on the inside of the casing and intimate contact with the food products stuffed into the casing.

As an alternative, the casing with the indicia on its exterior surface can be inverted and then shirred. This places the indicia material on an inside surface of the casing so there is no need to invert the casing during stuffing.

It is conventional during the course of shirring a cellulosic casing to spray the interior surface of the casing with an aqueous solution. For example, U.S. Pat. No. 3,981,046 describes a conventional humidification technique in which an aqueous solution is applied as an internal spray to humidify the casing to raise the moisture content of the casing to a level better suited for shirring and subsequent stuffing.

Application of the indicia material onto the exterior surface of the casing is preferably accomplished "off-line" after the casing manufacturing process is complete, or alternatively "in-line" as part of the casing manufacturing process.

Referring now to the FIG. 1A schematic flexographic printing system, the indicia substrate as for example tubular cellulose food casing is unwound from reel 10. This casing which is unwound in flattened form 11, typically has an as-manufactured moisture content of about 15 wt.% water (bone dry basis). This flat casing is directed by at least one guide roll to a further moisturizing system which for example may comprise spray members 12a and 12b positioned for discharging water spray 13 on both flat surfaces of the semi-finished casing substrate. The purpose of this further moisturization to about 19 wt% water (bone dry basis) is to compensate for the water lost in the indicia dryer downstream from the indicia application section (discussed hereinafter).

The further moisturized flat casing 14 is directed to the colorant application system (sometimes referred to in the art as a printing head) including colorant-aqueous solution supply pan 15a and fountain roll 16a positioned for partial immersion in the colorant-aqueous solution pool during rotation. Fountain roll 16a is provided with a flexible outer surface capable of receiving the colorant-aqueous solution and holding same by surface tension. The colorant-aqueous solution containing fountain roll 16a contacts anilox roll 17a having an etched outer surface with many cells to hold the transferred mixture. Anilox roll 17a in turn contacts a printing plate mounted on cylinder 18a. The latter may for example comprise a rubber strip containing the desired indicia or pattern. The colorant-aqueous solution is transferred from anilox roll 17a to the printing plate of cylinder 18a.

The further moisturized flat cellulose casing 14 is directed by backup roll 19a into contact with the colorant solution indicia portion-dispensing circular printing plate on the outer surface of cylinder 18a. The desired indicia colorant portion is thereby deposited as a layer on the cellulose casing outer surface as a supporting substrate in adhering relation thereto, forming the colorant indicia portion-containing further moisturized flat cellulose casing 20. The latter is directed to first drier 60 for heating by means 62, e.g. electrical or fluid, to evaporate the water from the colorant layer.

The so-dried colorant indicia portion-containing casing 64 is directed to the binder-sealant application system including binder-sealant and organic solvent mixture supply pan 15b. This system functions in the same manner as the aforedescribed colorant application system, and includes supply pan 15b, fountain roll 16b, anilox roll 17b, cylinder 18b and backup roll 19b. The binder-sealant and organic solvent mixture layer is applied over the dried colorant indicia portion in registry therewith so as to entirely enclose the colorant layer top portion. However, the binder-sealant and organic solvent layer surface area is slightly larger than the colorant surface area with the former's perimeter outwardly extending beyond the colorant layer extremities so as to directly contact the cellulose substrate.

The flat cellulose casing 66 having the colorant under layer and binder-sealant and organic solvent over layer indicia is now passed to second drier 68 for heating by means 70, e.g. electrical or fluid to evaporate the organic solvent from the over layer so as to form a dry binder-sealant coating entirely enclosing the dry colorant layer top surface, being adhered thereto and the surrounding substrate. Moisture is of course also evaporated from the cellulose substrate during the indicia drying, and the water content of the dried indicia-containing flat cellulose casing 23 discharged from the second drier 68 may be about 14 wt..% $H_2O$ (bone dry basis). This is about the same moisture content as the casing 11 unwound from reel 10. As previously explained, the purpose of further moisturizing system 12a–12b is to add sufficient water to compensate for that loss in drier 68. This moisture level (and additional moisture) is needed if the indicia-containing casing 23 is to be shirred. It is also preferred for maintaining physical integrity of the cellulose casing during the various processing steps of the flexographic printing system. This will avoid cracking or breaking because of excessive rigidity on one hand, and yet the cellulose casing will not contain so much moisture as to be non-self supporting.

The dried indicia-containing flat cellulose casing 23 discharged from second drier 68 is hot and may for example be at 60°–80° C. It is directed by guide roll 24 for transport around chill roll 25 for cooling by cold water jacket 26 to relieve thermal stresses. The so-cooled, dried indicia-containing flat casing 27 is rewound on roll 28 for storage until needed for further processing, preferably including shirring, prior to transport to customer packing houses.

The above-described printing system is for the preparation of an article wherein the bottom surface of the colorant layer is in contiguous association with the substrate, that is, the indicia comprises two layers, a colorant under layer and a binder-sealant over layer. As previously explained, another article of this invention has a first binder-sealant layer with its bottom surface adhered to the substrate. The under surface of the colorant layer is superimposed on the top surface of the first binder-sealant layer in adhering and nondiffusible relationship therewith. A second binder-sealant layer comprises the binder-sealant superimposed over the colorant layer. The first binder-sealant also has a melting point above about 100° F. and is water soluble. For this embodiment another binder-sealant application system is needed, and the above-described system comprising elements 15b through 19b would be suitable along with second drier 68. This system would be placed upstream the colorant application system 15a through 19a and downstream unwind reel 10.

FIG. 1B illustrates an embodiment of the invention article comprising cellulose substrate 80b having thereon a desired overlay-type indicia entirely surrounded by the substrate. The indicia in turn comprises a water soluble dry colorant underlayer 81b in nondiffusible association with the substrate, and a binder-sealant layer 82b superimposed over and entirely enclosing the colorant layer top surface in adhering relationship with the colorant layer top surface. The perimeter of the binder-sealant layer 82b outwardly extends beyond the extremities of the colorant layer so as to directly contact the surrounding substrate 80b in adhering relationship therewith. This covering and enclosing function of the binder-sealant portion of the indicia is essential to isolate the colorant portions of the indicia from the surrounding environment. The latter includes moisture, and without the protective enclosing cover the water soluble colorant layer would be at least partially dissolved either during handling and storage of the indicia-containing article, or during attempted transfer to the outer surface of the food body.

To perform its protective enclosing function, the binder-sealant is formed of material which is water insoluble. Moreover, the binder-sealant material has a melting point above about 100° F., which represents the warmest ambient temperature to be encountered in handling and storage. This is because the binder-sealant must be physically stable and able to perform its function as the colorant enclosure until placed in contact with the edible food surface for the desired transfer of the complete indicia.

FIG. 1C illustrates the outer surface of the processed meat body along with the transferred FIG. 1B indicia. As will be subsequently demonstrated, for some combinations of substrate-indicia-meat body the transfer may occur by contacting the indicia with a meat body outer surface which has already been processed, but this Figure shows the functional relationship between the various constituents for an indicia-containing meat body wherein the indicia transfer occurs during processing. The binder-sealant 82c has penetrated the meat body outer surface 83c into the body itself, and soluble proteins from the meat body have migrated into the transferred colorant layer 81c. These proteins are denatured during the thermal processing and at least physically bond or adhere the colorant to the processed meat. There may also be a chemical reaction between the denatured proteins of the meat and the colorant depending on the type of colorant used. For example, the carbohydrate portion of caramel probably engages in a Maillard-type reaction with the meat proteins. Whatever the mechanisim, the bond is sufficient to prevent loss of the water soluble caramel when the caramel indicia-containing processed meat body outer surface is contacted with moisture.

For physical comparison purposes, the cellulose substrate-supported indicia of FIG. 1B is sufficiently thick to be felt by rubbing one's hand across the substrate, but the transferred indicia of FIG. 1C has sufficiently penetrated the meat body during processing so that it may not be located by hand rubbing.

FIG. 1D illustrates another embodiment of the invention article comprising cellulose substrate 80d having thereon a desired sandwich-type indicia entirely surrounded by the substrate. The indicia in turn comprises a first binder-sealant layer 84d with its bottom surface adhered to the substrate 80d, a water soluble dry colorant layer 81d with its under surface superimposed on the top surface of the first binder-sealant layer 84d in adhering and nondiffusible relationship therewith, and a second binder-sealant layer 82d. The latter is superimposed over the colorant layer 81d top surface and extends beyond the colorant layer extremities in adhering relationship therewith so as to entirely enclose the colorant layer. The outer perimeter of at least one of the first binder-sealant layer 84d and the second binder-sealant layer 82d outwardly extends beyond the colorant layer extremities so as to directly contact the surrounding cellulosic substrate 80d in adhering relationship for the same reasons discussed in connection with the overlay-type indicia FIG. 1B. That is, FIG. 1D shows the perimeters of both the first and second sealant-binder layers (84d and 82d respectively) adhered to the surrounding substrate 80d, but this is not essential. For example, the first sealant-binder layer 84d outer perimeter may be coextensive with the colorant layer 81d outer perimeter, and also entirely enclosed by the superimposed second sealant-binder layer 82d outer perimeter which is adhered to the surrounding substrate 80d. Conversely, the second sealant-binder layer 82d outer perimeter need only enclose the colorant layer 81d outer extremities and merge outside the colorant layer with the first sealant-binder. In this embodiment the latter extends beyond the colorant layer 81d perimeter and is adhered to the surrounding substrate 80d.

FIG. 1E illustrates the outer surface of the processed meat body along with the transferred FIG. 1D indicia.

As with the FIG. 1C transferred indicia, the FIG. 1E indicia has been transferred during high temperature processing of the meat body to the latter's outer surface 83e. The second binder-sealant 82e has penetrated the meat body outer surface 83e into the body itself, and as previously described in connection with FIG. 1C, the migrated soluble proteins from the meat have denatured and at least physically bonded the colorant 81e to this processed meat. The first binder-sealant 84e is still adhered to the colorant (now its outer layer) and has also migrated to the surrounding meat outer surface and is also bonded by the migrated denatured proteins to the meat body. The first binder-sealant 84e is preferably transparent as the latter covers and encloses the colorant outer surface. Accordingly, the colorant layer 81e is visible through the preferably transparent first binder-sealant layer 84e.

Although the FIG. 1E sandwich-type embodiment of the indicia-containing food body has been described and illustrated as comprising three distinct layers, in practice the layers may not always be visually distinct because of their extreme thinness and the aforedescribed meat protein migration. However, it is apparent that they are functionally intact because of their reverse order transfer from the substrate during food processing.

FIG. 2 illustrates one casing embodiment of the article aspect of the present invention wherein the indicia 30 is formed of a dry colorant under layer and a binder-sealant cover layer. As shown, the indicia 30 is in the form of a repeated ordered indicia bonded to and extending along the casing exterior surface 31. The repeat and order derives from applying the indicia onto casing exterior surface 31 as the casing 14 moves at a relatively constant speed across a printing wheel 18 rotating at the same speed (FIG. 1A). The particular indicia illustrated in FIG. 2 is composed of a plurality of short parallel line segments 32 disposed transverse the longitudinal axis 33 of the casing to simulate grill marks.

The grill marks 32 are disposed on a surface of the casing adapted to come into direct with the food product stuffed into the casing. Since the indicia 30 is disposed on an exterior surface 31 of the casing and is substantially nondiffusible into and through the casing wall, the casing must be inverted either before or during stuffing to locate the pattern 30 on the inside of the casing.

Figure 4:
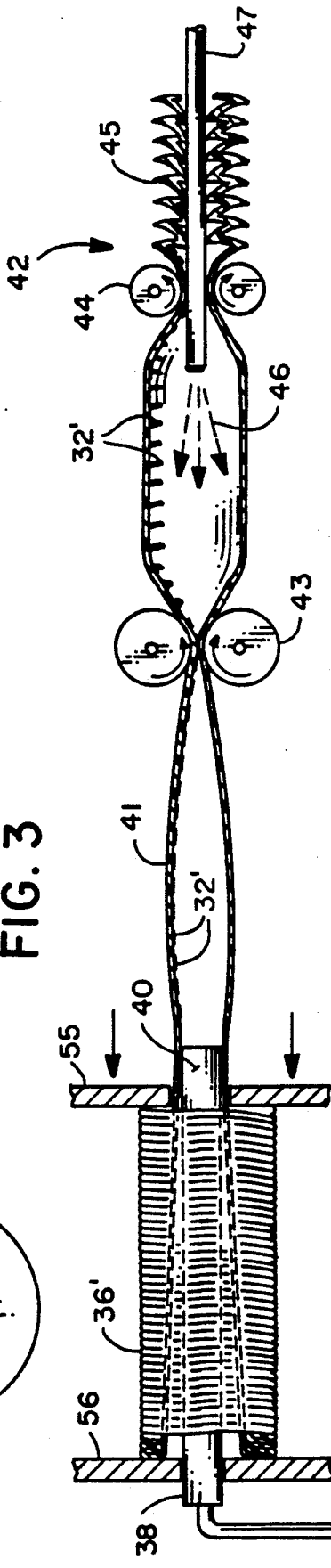
FIG. 4 is a schematic representation of a system for first loosely shirring the FIG. 2 article, inverting and then reshirring the article with the indicia on the casing inside surface.

FIGS. 3 and 4 illustrate alternative methods for shirring the indicia-containing casing illustrated in FIG. 2. In FIG. 3, reel 28 from FIG. 1A comprises indicia- containing casing article 27 having indicia composed of a pattern of grill marks 32 on its outer surface. Casing from this reel is unreeled and fed directly to a conventional shirring machine generally indicated at 29. Shirring proceeds in a conventional manner in that the casing article 27 is inflated and fed onto a mandrel 34. The casing passes along the mandrel and through a conventional shirring head 35 which gathers the casing into pleats and forms a shirred stick indicated at 36. The shirring mandrel 34 is hollow so that an aqueous shirring solution can be delivered as a spray 37 to the interior of the casing. As mentioned hereinabove, a conventional shirring solution includes a water phase. This is applied in an amount sufficient to rehumidify the casing in order to raise the moisture content from about the 14% level of the reeled casing to a level suitable for shirring and stuffing, i.e. in the range of about 20% to about 38% moisture (based on bone dry cellulose) for nonreinforced casing. In the shirring method as shown in FIG. 3, the total moisture added by the shirring solution would be about 12% to 14% in order to raise the casing moisture content from about the 14% level of the reeled casing to preferably about 26% to 28% (bone dry basis).

The shirred stick 36 formed in this fashion contains casing having the indicia e.g., pattern of grill marks 32, on an outside surface. Accordingly, this stick would be inverted during stuffing so as to locate the pattern of grill marks 32 on the inner surface (i.e. the food contacting surface) of the casing. Inversion during stuffing ("reverse stuffing") is accomplished by turning and passing the casing through the bore of the stick as generally shown, for example, in U.S. Pat. Nos. 4,292,711 and 4,162,693.

During reverse stuffing the stick end closure is pushed through the entire length of the stick, as shown for example in U.S. Pat. No. 4,292,711. For this reason an end closure of the type disclosed in U.S. Pat. Nos. 4,759,100 and 4,693,280 is preferred, particularly such an end closure having a relatively long plug of casing length which is not tightly compressed. The reduced compression plug results in an end closure having a lower deplugging force through the stick bore. Another preferred feature of a reverse stuffing system is a low friction stuffing horn such as one having a "Teflon" coated surface to reduce drag during movement of casing across the surface.

Shirred sticks for the production of frankfurters are usually twisted during shirring to improve the straightness of the stick as disclosed for example in U.S. Pat. Nos. 3,398,069 and 4,649,961. When using reverse stuffing and a stuffing machine of the type shown in U.S. Pat. No. 3,115,668 (FAM Machine) to produce frankfurters, there is a preferred direction of twist. In this respect, the FAM Machine rotates the shirred stick about the stuffing horn during stuffing. For reverse stuffing it is preferred to use a stick which has been twisted, during the preceding shirring step, in a direction which is opposite to the direction of the rotation of the stick on the stuffing horn of the FAM Machine. This opposite direction of stick twist will counteract a tendency of the deshirred casing (passing through the bore of the stick) to twist about the stuffing horn. Unless counteracted, the twisting of the deshirring casing about the stuffing horn may cause the casing to bind and seize to the horn and break.

During reverse stuffing it is also preferred to maintain a clearance between the stuffing horn and the inner peripheral surface of the stick. This will provide a clear passage for the deshirring casing and further help to avoid binding of the deshirred casing to the horn. Maintaining a clearance space is accomplished preferably by a thrust collar which is positioned around and pressed axially against the deshirring end of the rotating shirred stick. Such a thrust collar will maintain coaxial alignment of the stuffing horn and a shirred stick, and avoid eccentric rotation of the stick about the horn. The FAM Machine has a follower which pushes against the end of the shirred stick. Modifying this conventional follower to receive a thrust collar for purposes described hereinabove is well within the skill of the art and the thrust collar per se forms no part of the present invention.

It should be appreciated that the deshirring force for reverse stuffing is substantially higher than for conventional stuffing, so that in a particular reverse stuffing system it may be desirable to reduce the required force to avoid casing breakage. Those skilled in the art will appreciate that the deshirring force may, for example, be reduced by using a surfactant such as one or more alkylene oxide adducts of fatty acids or fatty acid partial esters, e.g. "Tween 80" manufactured by Atlas Chemical Industries, Inc. or "Mazol 80" a product of Mazer Chemicals, Inc., in the shirring solution to form a surfactant layer on the casing. For the same reason, surfactants are preferably also used in the oil lubricant for the shirring wheel-casing outside surface interface, e.g. 0.5 wt% Mazol 80 in mineral oil. Another approach to lower the deshirring force is the use of lower density shirring in compression (i.e., lower pack ratio) than the otherwise maximum value obtainable. This will reduce the drag effect of the deshirring casing because a less tightly packed or compressed casing will deshirr more easily and with less force than a tightly packed casing. Still another technique for reducing the deshirring force is to use shorter than conventional shirred lengths which also reduces the drag effect as the deshirring casing passes through the bore of the shirred stick.

On the other hand, the deshirring force should not be reduced to the level at which the shirred casing stick coherency is substantially reduced, as this would prevent normal handling without damage.

In one successful demonstration of reverse stuffing, a size 24 (1.26 inch flat width) nonreinforced cellulosic casing was used to produce a shirred stick. The latter's pack ratio was 82, the shirred stick length was 14 inches and a centering type thrust collar was used at the stick deshirring end. This casing was stuffed at a commercial rate of about 220 ft/min. with no casing breakage using a FAM Machine.

In FIG. 4, casing with the indicia on its outer surface is shirred as in FIG. 3 but preferably loosely. The resulting loosely shirred article 36' is then placed on a hollow mandrel 38. To prevent article 36' from slipping off mandrel 38, a support member 55 is disposed at the end of article 36'. The support member 55 may also be biased in a conventional manner (not shown) such as by air or spring means, so as to continuously be a support for shirred article 36' as it is being deshirred. In addition, a second support member 56 can be disposed at the opposite end of shirred article 36' thereby maintaining and fixing article 36' between members 55 and 56. Coupled to one end of mandrel 38 is an air supply pump 39.

The end of the loosely shirred article 36' proximal the air supply end of mandrel 38 is deshirred and fed through the bore of the loosely shirred article 36' and transported over the opposite end 40 of mandrel 38 where the casing becomes inflated through activation of the air pump 39. As the end of shirred article 36' against support member 55 is deshirred and fed through the bore of article 36', the length of the article will become progressively smaller. Support 55 is biased to the left as shown by the arrows in FIG. 4 to maintain a supporting contact with the shirred article. This support arrangement will effectively prevent shirred article 36' from slipping off the mandrel 38.

The inflated casing 41 now has the indicia 32' on its inner surface, and is reshirred by movement through second shirring machine 42. After passing through squeeze rolls 43 shirring proceeds in a conventional manner by passing the casing through shirring head 44 which gathers the casing into pleats and forms a shirred stick indicated at 45. The shirring solution spray 46 is delivered through the outlet of mandrel 47.

This loose shirring - inversion second shirring system is of the type described in U.S. Pat. No. 4,162,557 and locates the indicia on the inside of the casing. Alternatively, the casing article 27 from reel 28 (FIG. 1A) may be first unreeled, loosely shirred and cut from the supply reel. These shorter shirred lengths are then inverted and rewound onto a new reel. The casing is then unreeled and fed directly to the second shirring machine 42.

Figure 5:
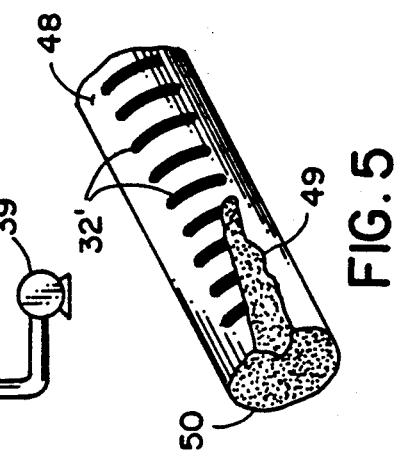
FIG. 5 is a frankfurter with spaced indicia on its outer surface, which can be prepared using the FIG. 2 indicia-containing casing article using the shirring systems of FIG. 3 or 4.

FIG. 5 illustrates a skinless frankfurter 48 made in the FIG. 2 casing. The frankfurter has a pattern on its outer surface derived from indicia material applied to the casing in which the frankfurter was made. In the embodiment shown, the pattern simulates grill marks 32' in mirror image to the pattern 30 on the casing (FIG. 2). It should be noted that the grill marks are composed of the overlay or sandwich-type indicia indelibly transferred to the frankfurter surface. As shown in FIG. 5, the grill marks 32' are restricted substantially to the frankfurter surface 49 and the coloring material does not to any significant extent diffuse into the body 50 of the frankfurter beneath the surface.

Figure 6:
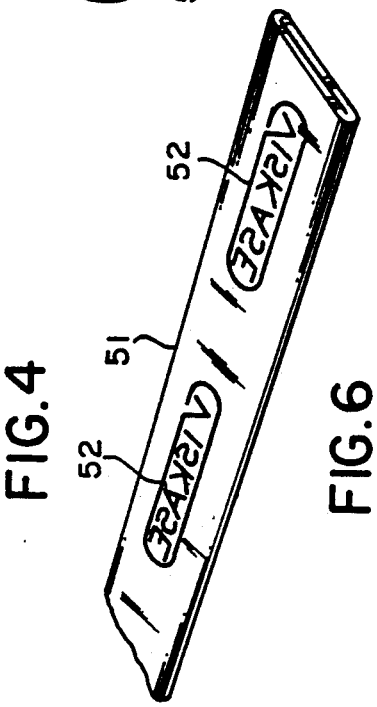
FIG. 6 is a flattened casing substrate with a mirror image corporate logo as the indicia on its outer surface.

FIG. 6 illustrates a flat cellulose casing 51 having on its outer surface, indicia in the form of a corporate logo 52 with adjacent logos longitudinally spaced from each other and formed in the mirror image of the desired indicia.

Figure 7:
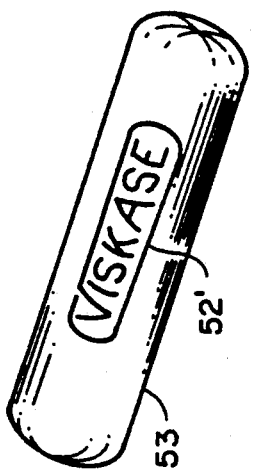
FIG. 7 is a frankfurter with the FIG. 6 logo on its outer surface.

FIG. 7 illustrates a skinless frankfurter 53 made using the casing embodiment of FIG. 6. Here the frank- furter carries the indicia comprising a corporate logo 52' which is in mirror image to the logo 52 on the casing 51.

Colorant

Although many types of colorants are functionally suitable for use in this invention, there are stringent governmental restrictions on this selection because the indicia formed therefrom is directly adhered to an edible surface. Accordingly, the selected colorant must be suitable for human consumption, and in the U.S. must be certified as "food approved" by the Food and Drug Administration. Organic dyes in this category are generally referred to as "FD&C" types, and the following Table A is a current list of the FD&C colors.

TABLE A

| | FD & C Colors | |
|---|---|---|
| Designation | Common Name | Chemical Name |
| Red No. 3 | Erythrosine | Disodium salt of 9(o-carboxyphenyl) 6-hydroxy-2, 4, 5, 7-tetraiodo-3H-xanthen-3-one. |
| Red No. 40 | None | Disodium salt of 6-hydroxy-5-[(2-methoxy-5-methyl-4-sulfophenyl)azo]-2-naphthalenesulfonic acid. |
| Yellow No. 5 | Tartrazine | 5-oxo-1-(p-sulfophenyl)-4-[(p-sulfophenyl)azo]-2-pyrazoline-3-carboxylic acid, trisodium salt |
| Yellow No. 6 | Sunset Yellow FCF | Disodium salt of 1-p-sulfophenylazo-2-naphthol-6-sulfonic acid. |
| Green No. 3 | Fast Green FCF | Disodium salt of 4-{[4-(N-ethyl-p-sulfobenzyl amino)-phenyl]-(4-hydroxy-2-sulfonium phenyl)-methylene}-[1-(N-ethyl-N-p-sulfobenzyl)-$\Delta^{2,5}$-cyclohexadienimine]. |
| Blue No. 1 | Brilliant Blue FCF | Disodium salt of ethyl [4-[p[ethyl (m-sulfobenzyl) amino]-a-(o-sulfophenyl) |

TABLE A-continued

FD & C Colors

| Designation | Common Name | Chemical Name |
|---|---|---|
| | | benzylidene]-2,5-cyclohexadien-1-ylidene] (m-sulfobenzyl) ammonium hydroxide inner salt. |
| Blue No. 2 | Indigotine | Disodium salt of 5,5'-disulfo-3-3'-dioxo-$\Delta^2$, 2'-biindoline. |

It will be appreciated by those skilled in the art that secondary colors may be prepared from the above-listed primary colors to form an organic dye of virtually any desired tint. The resulting secondary color dye may then be used to form an indicia of the desired color. For example, following is a representative list of brown-type colors which may be formulated by blending FD&C dyes:

| Shade | FD & C Dye | % Blend |
|---|---|---|
| Butterscotch | Yellow #5 | 74 |
| | Red #40 | 24 |
| | Blue #1 | 2 |
| Chocolate | Red #40 | 52 |
| | Yellow #5 | 40 |
| | Blue #1 | 8 |
| Caramel | Yellow #5 | 64 |
| | Red #3 | 21 |
| | Yellow #6 | 9 |
| | Blue #1 | 6 |

Alternatively, brown FD&C dye may be purchased in the premixed form.

Caramel is the preferred colorant in the practice of this invention, primarily because of its relatively high molecular weight compared to other suitable colorants. For example, most caramels have average molecular weights in the 2600–5000 range whereas FD&C dyes have molecular weights in the 450–800 range. This relatively high molecular weight is advantageous because the high viscosity inhibits the flow of the colorant during the necessary processing steps in the practice of this invention thereby reducing the possibility of loss from the desired indicia to surrounding surfaces.

Caramel is a brown to black liquid or solid having the characteristic odor of burnt sugar and a pleasant bitter taste. At normal usage levels it has little or no taste, however. Caramel is prepared by the controlled heat treatment of the following food-grade carbohydrates: dextrose, invert sugar, lactose, malt syrup, molasses, starch hydrolysates and fractions thereof, and sucrose. Various food-grade acids, alkalies, and salts may be used to assist caramelization. From the physical standpoint, caramel consists essentially of coloidial aggregates which are soluble in water but only partly soluble in alcohol-water solutions.

Caramels are classified by caramel manufacturers in terms of their colors, based on constituents used to assist caramelization. These classes are as follows:

Class I—Plain Caramel Color,
Class II—Caustic Sulfite Caramel Color,
Class III—Amonia Caramel Color,
Class IV—Sulfite-Amonia Caramel Color The molecular weight distributions of the four classes of caramel are as follows:

TABLE I

| Molecular Wt.[1] | Class I | Class II | Class III | Class IV |
|---|---|---|---|---|
| Below 2,000 | — | 87% | 64% | 55% |
| 2,000–10,000 | — | 10% | 4% | 15% |
| Above 10,000 | — | 3% | 32% | 30% |
| Arithmetic Avg.[2] 5000 | — | 2600 | | 4700 |

[1]Information from Sethness Products Company
[2]Arithmetic average determined with values of 2,000, 6,000 and 10,000 for the above three ranges

Binder - Sealant

The binder-sealant performs several functions in this invention. Firstly, it serves to bond the colorant layer to the substrate in the desired indicia. As the colorant is water soluble, the binder-sealant must be water insoluble to prevent smearing of the colorant during the substrate-to-food transfer (in the presence of moisture). When dried by evaporation of the organic solvent, the binder-sealant must form a physical bond to both the colorant (as a cover enclosing the colorant layer top surface) and the substrate. As previously explained, the binder-sealant perimeter outwardly extends beyond the colorant layer extremities so as to directly contact the substrate in adhering relationship. Also, the binder-sealant must seal the colorant from contact with water. In this manner, the binder-sealant protects the water soluble colorant against water dilution (or even complete removal) during both storage of the indicia-containing substrate in a moisturized atmosphere and subsequent food contact and processing in a moisturized water environment.

A further requirement of the binder-sealant is that it must be retained on the outer surface of the substrate, and not migrate into the substrate interior. If this were to occur, the binder-sealant would probably carry a portion of the water soluble colorant under the substrate surface and it would be difficult if not impossible to subsequently transfer this portion of the colorant to the edible surface. For this reason, it is preferable to use relatively high molecular weight material as the binder-sealant, which is too big to physically enter the substrate interior.

A still further requirement of the binder-sealant is that it must be capable of substantially complete transfer from the substrate to a contiguous edible surface in the presence of moisture, and carrying the colorant in this transfer. In many end uses of the inventive article, this transfer occurs during elevated temperature processing, i.e. cooking of the food body while encased in the aforementioned substrate in the form of a casing. However, it has been discovered that with at least certain embodiments the transfer from the substrate to an edible surface may be effected at ambient temperature.

The mechanism of the substrate-to-edible surface transfer is not fully understood but is probably due to a difference in the bonding forces between the substrate and the dried colorant, binder-sealant covering indicia or colorant, binder-sealant sandwich indicia ("substrate bonding") on one hand, and between the edible surface and the dried indicia ("edible surface bonding") on the other hand. Apparently, the edible surface bonding sufficiently exceeds the substrate bonding for substantially complete transfer of the indicia from the substrate to the edible surface. As used herein, "substantially complete transfer" means that the transferred indicia covers substantially the entire area of edible surface in contiguous contact with the area covered by the original indicia on the substrate. It does not necessarily mean that substantially all of the layered colorant and binder-sealant forming the indicia is transferred from the substrate to the edible surface.

The preferred binder-carriers in the practice of this invention are shellac and zein. Shellac is an insect- exudate from Asia, and zein is water insoluble prolamine protein from corn gluten. Shellac is preferred because of slightly superior transfer properties. Other suitable binder-sealants may include nitrocellulose lacquers, vinyl lacquers, acrylic vinyls and polyamides, probably in modified form. Certain of these vehicles by themselves do not appear to provide all of the required and preferred characteristics for use as binder-sealants in the practice of this invention. That is, they do not facilitate substantially complete transfer from the substrate to the edible surface, or they do not completely provide the sealant or binder functions. However, these deficiencies can probably be overcome by the use of other resin or plasticizer modifiers as for example ethylene vinyl acetate resin, polyester resin, dibutyl phthalate plasticizer or tricresyl phosphate plasticizer.

Substrate

The substrate, to which the desired indicia is bonded is preferably nonporous. That is, the substrate is preferably substantially impenetrable by the aforementioned indicia. If the substrate is porous, the mixture in part enters the substrate inner body. Using only contiguous contact under conventional processing conditions for edibles, it then becomes more difficult to withdraw substantially all of the indicia from the substrate inner body and transfer same as part of the indicia from the substrate to the contiguous edible surface. Also, during elevated temperature processing, a flowable food such as an emulsion may in part enter the substrate main body and form a strong bond preventing separation of the porous substrate and the indicia-containing food body.

The substrate should preferably be flexible. This means that it should be capable of contouring to the colorant or sealant-binder dispensing printing surface (as for example a roller), for indicia deposition thereon in a substantially uninterrupted manner. Then the so-contoured indicia containing substrate must retain its physical integrity in assuming a possibly different contour or contours for handling and storage, e.g. in flat form until needed for indicia transfer to the contiguous edible surface. Since the latter is not necessarily itself flexible, the indicia-containing substrate should preferably be able to assume a possibly still different contour for the edible surface contiguous contact necessary to substantially completely transfer the indicia to the edible surface.

To assure flexibility, certain types of substrates require plasticizers. For example cellulosic substrates such as food casing must include plasticizer, most commonly polyhydric alcohols such as glycerine. Other substrates as for example thermoplastic films may not require a separate plasticizer compound for flexibility.

The substrate is preferably smooth surfaced to both assure that the colorant layer or the binder-carrier layer(s) contact substantially the entire substrate surface for bonding thereto, yet can be substantially completely transferred therefrom to the contiguous edible surface. If the substrate has substantial texture the indicia may only contact the ridges and not flow to the craters, leaving the low crater portions uncolored. The same deficiencies in the substrate indicia may then be transferred to the edible surface. Even if the solution reaches the craters of a textured surface, this portion of the indicia may not intimately contact the edible surface, resulting in less-than-complete transfer. On the other hand, it should be recognized that for some edible surface indicia the color need not be perfectly continuous but instead in the form of colored sections at least partially surrounded by uncolored sections. An example of the latter is the so-called "process" type of printing in which the indicia color comprises small dots surrounded by uncolored background.

Although the preferred substrate is cellulose casing, other materials are suitable as for example a substrate formed from a thermoplastic film, preferably in the form of a casing. The film may for example be ethylene vinyl acetate (EVA), a copolymer of vinyl chloride and vinylidene chloride (saran), or polyethylene. The latter broad category includes for example, high density polyethylene, medium density polyethylene and low density polyethylene, as these sub classifications are understood by those skilled in the art. Another preferred type of polyethylene is a copolymer of ethylene and an alpha olefin having between 3 and 8 carbon atoms, generally known as very low or ultra low density polyethylene. Moreover, the film substrate may be the innermost layer of a multilayer film which for example includes an oxygen barrier layer as a core. Suitable well-known core layer materials include ethylene vinyl alcohol (EVOH), nylon, saran and a copolymer of vinyl chloride and methyl acrylate (MA saran). If a multilayer film is used with a core layer, there are preferably at least three layers comprising the innermost substrate layer on which the indicia are printed, the core-barrier layer and an outer layer preferably selected to provide high resistance to puncture and abuse. Suitable materials for the outermost layer include EVA and the various polyethylenes.

Edible Surface

The edible surface to which the indicia is transferred may be primarily carbohydrate such as pie dough or bread, or protein such as frankfurter, ham or poultry such as turkey. The edible surface may also be mixtures such as turkey- bologna lunch meat. The edible surface may also be protein such as cheese.

Transfer in Presence of Water

Either or both the indicia substrate and the edible surface must contain water moisture or the transfer must be in a highly water moisturized environment. This requirement is most conveniently satisfied by the water moisture in edible bodies. Moisture is needed because the indicia is at least partially permeable and moisture appears to be uniquely able to penetrate the indicia and weaken the indicia colorant or binder-sealant bonding to the substrate.

Indicia Transfer

For certain embodiments of the indicia substrate-to-edible surface transfer, the surfaces may be contacted at ambient temperature. The need for elevated temperature substrate-edible surface contact for indicia transfer depends on several considerations. These include the types of substrate, edible surface, quantity of water present and desired transfer time. In general it is believed that for high speed commercial processing, the contact time should be minimized and with this requirement elevated temperature contact will be preferred. For complete transfer with minimum contact time, it is also preferred to have at least 60% by wt. water in the edible surface. This will insure adequate lubrication to quickly release the dry indicia from the substrate and transfer same to the edible surface.

The invention will be more clearly understood by reference to the following non-limiting examples.

EXAMPLE 1

In this example, a series of tests were performed using smooth and powdered thermoplastic film as the substrate with two different types of colorant (caramel and FD&C brown dye). In all instances, the binder-sealant was shellac. Different types of edible foods were used i.e. cheese (protein) and turkey (fowl). Also, the foods were used in different forms, i.e. lunchmeat, ground particles (fresh ground turkey) and large pieces (fresh turkey breast). Finally, the indicia transfer test was performed at both ambient temperature and food processing temperature (180° F.).

More specifically, the substrate was an ethylene vinyl acetate (EVA) surface of a commercially employed irradiated multilayer film of about 2 mils thickness. In one series of tests, the substrate film was smooth and in another series the substrate film contained powdered starch. The films were not corona-discharge treated, even though such treatment is known to improve the coating-to-film adhesion properties.

The caramel-containing aqueous solution was prepared by mixing 50 wt% caramel powder (type 858 manufactured by Sethness Products Co., Chicago, Ill.) in water, and this solution was applied to the film substrate by a flexographic hand proofer as a layer about 4 inches wide × 14 inches long. After air drying for about 5 minutes, the dried caramel indicia portion was about 0.03 mil thick.

The binder-sealant solution was prepared by mixing 20 wt% clear shellac (food grade "lac" dewaxed white type purchased from Bradshaw Praeger & Co., Chicago, Ill.) and 80 wt% normal propyl alcohol solvent. This solution was applied over the dried caramel layer top surface by a flexographic hand proofer so as to entirely enclose the caramel layer top surface and extend about ¼ inch beyond the latter's outer extremities. This binder-sealant directly contacted the surrounding film substrate. The solvent was air dried in a very short period—about 5 seconds—and the shellac adhered to both the caramel top surface and the surrounding film substrate. The thickness of this dried shellac binder-sealant layer was about 0.04 mils. These caramel underlayer-shellac overlayer indicia containing thermoplastic film substrate articles were used in a series of indicia-to-food transfer tests discussed hereinafter.

For another series of articles, brown FD&C dye was used as the colorant. This brown dye was prepared by mixing the following three FD&C dyes (all obtained from Warner-Jenkinson Co., St. Louis, Mo.) in the indicated proportions: 30.5 wt% Yellow No. 6, 45.0 wt% Red No. 40, and 24.5 wt% Blue No. 1. Carboxymethylcellulose ("CMC") was used as a carrier for the brown dye colorant; the procedure was to first dissolve the CMC in water and prepare a 4% by wt. CMC-containing aqueous solution. The brown dye was then added in dry form to the CMC-containing aqueous solution so as to comprise 15 wt% of the final solution. This mixture was then applied to the same EVA film substrate and dried in the same manner as the aforedescribed caramel layer to provide an underlayer of about 0.03 mil thickness. The same shellac-normal propyl alcohol solution was applied over the dried brown dye layer top surface in the aforedescribed manner, followed by drying. The thickness of this dried shellac binder-sealant overlayer was also about 0.04 mil. These brown dye underlayer-shellac overlayer indicia containing thermoplastic film substrate articles were also used in a series of indicia-to-food transfer tests.

For the indicia transfer tests, a 4 in.$^2$ section of the indicia-containing film was placed on the edible food surface and these combinations wrapped in aluminum foil. The combinations were unwrapped after 15 minutes at ambient temperatures and the indicia transfer was complete. For the elevated temperature indicia transfer tests, fresh ground turkey and fresh turkey breasts were used as the edible surface and the indicia-containing thermoplastic film was positioned in contiguous contact with the edible surface. The combinations were wrapped in aluminum foil and heated at 170°–180° F. for three hours to cook the meat. After cooking, the films were removed and the meat outer surfaces were examined immediately thereafter; indicia transfer was complete. These transfer tests are summarized in Table B.

TABLE B

| | | | Film-To-Meat Indicia Transfer | | |
|---|---|---|---|---|---|
| Test No. | Film Surface | Colorant | Food Surface | Transfer* Temp. Ambient | 170°–180° F. |
| 1-A | Smooth | Caramel | Turkey Lunchmeat | Yes | — |
| 1-B | Smooth | Brown Dye | Turkey Lunchmeat | Yes | — |
| 1-C | Powdered | Caramel | Turkey Lunchmeat | Yes | — |
| 1-D | Powdered | Brown Dye | Turkey Lunchmeat | Yes | — |
| 1-E | Smooth | Caramel | Processed Cheese | Yes | — |
| 1-F | Smooth | Brown Dye | Processed Cheese | Yes | — |
| 1-G | Powdered | Caramel | Processed Cheese | Yes | — |
| 1-H | Powdered | Brown Dye | Processed Cheese | Yes | — |
| 1-J | Smooth | Caramel | Ground Turkey | — | Yes |
| 1-K | Smooth | Brown Dye | Ground Turkey | — | Yes |

TABLE B-continued

Film-To-Meat Indicia Transfer

| Test No. | Film Surface | Colorant | Food Surface | Transfer* Temp. Ambient | Transfer* Temp. 170°–180° F. |
|---|---|---|---|---|---|
| 1-L | Powdered | Caramel | Ground Turkey | — | Yes |
| 1-M | Powdered | Brown Dye | Ground Turkey | — | Yes |
| 1-N | Smooth | Caramel | Turkey Breast | — | Yes |
| 1-O | Smooth | Brown Dye | Turkey Breast | — | Yes |
| 1-P | Powdered | Caramel | Turkey Breast | — | Yes |
| 1-Q | Powdered | Brown Dye | Turkey Breast | — | Yes |

*Transfer was complete in all tests.

Example 1 (and Table B) demonstrates several difficult aspects of the scope of this invention. For example, the three FD&C dyes comprising the tested brown dye mixtures are quite different chemically, as shown in Table A, yet they all transferred as part of the indicia to the meat surface (although there was some chromatographing of color with the turkey lunchmeat with the passage of time). Moreover, caramel is chemically quite different from any of the tested FD&C colors. Accordingly, it has been shown that a wide variety of water soluble colorants are useful in the invention.

This Example also shows that at least some substrate-to-edible surface indicia transfers may be effected at ambient temperature, i.e. for at least certain processed meats and cheese which do not require reheating. On the other hand, for edibles which require processing in a casing, the indicia may be transferred from the casing inner surface to the contiguously associated edible surface during processing of the edible body in the casing. That is, no additional processing step is needed to transfer the indicia to the edible outer surface.

Example 1 further shows that indicia may be transferred to different types and forms of edible surfaces. For example, complete transfer was achieved to three different forms of turkey, i.e. lunchmeat, large size meat pieces (turkey breast) and small pieces of meat (ground turkey). Although only turkey was tested, it is believed indicia transfer would be successful to other meats including different types of poultry, as for example, chicken and duck, as well as ham and sausage emulsions. The Example also demonstrates that indicia transfer may be accomplished with protein-type edible surfaces, as for example, processed cheese.

This Example additionally shows that substantially complete transfer may be obtained irrespective of whether the substrate is smooth surface or textured, although the former is preferred for reasons discussed under the heading "Substrate".

One preferred article of this invention comprises a shirred thermoplastic film casing having on a surface thereof as a substrate a desired indicia comprising a dry caramel layer with its bottom surface in contiguous and nondiffusible association with the film surface. A binder-sealant is superimposed over and entirely encloses the caramel top surface in adhering relationship, the binder-sealant perimeter outwardly extending beyond the caramel layer extremities so as to directly contact the surrounding film surface in adhering relationship therewith. In a preferred processable food package employing this article, the casing is filled with water moisture containing processable food having its water moisturized outer surface in direct contact with the casing inner surface. The binder-sealant top surface is in contiguous association with the food outer surface.

For certain embodiments of this invention, it is preferred that the indicia be moisture insensitive, i.e. for end uses where the substrate itself must have a high moisture content or where the indicia transfer occurs in a high moisture atmosphere. As used herein, "Moisture Insensitive" means that the indicia will not separate from the substrate to any appreciable extent (as evidenced by significant discoloration of the collected water) when the indicia-containing substrate is held under running ambient temperature cold water from a faucet at rate of about 1 U.S. gallon/minute for 30 seconds. This means that the indicia is not water soluble. The indicia-containing substrates of Example 1 were not moisture insensitive by this stringent standard. However, they were considerably less moisture sensitive than the corresponding thermoplastic film substrate-colorant layer article without the binder-sealant overlayer.

Also, for certain embodiments of this invention it is preferred that the indicia be bonded to the substrate in an abrasive resistant manner for reasons already discussed. As used herein "abrasion resistant manner" means that less than about 50% of the indicia surface area separates from the substrate when subjected to the Dry Scratch Test (hereinafter described). This performance standard is adequate when the indicia-containing substrate is to be used in a manner where the shear forces are minimal, as for example when the substrates are physically stacked or rolled in overlying compressive relationship for storage prior to transfer to the edible surface. However, when the indicia-containing substrate is to be used in a manner where the shear and torsion forces are extremely high, as for example on shirred cellulose food casings, the mixture is more preferably bonded to the substrate as an indicia in a "high abrasion resistant manner". As used herein "high abrasion resistant manner" means that the indicia will not only satisfy the abrasion resistant preferred manner requirement, but also that less than 50% of the indicia surface area separates from the substrate when subjected to the Wet Scratch Test (hereinafter described).

Scratch Tests for Adhesion

The indicia-containing substrate is placed on a smooth flat surface and using the backside of the investigator's index fingernail portion (with the fingernail in a smoothed out, i.e. filed condition) at a contact angle less than about 30 degrees to the substrate surface, the entire indicia surface area is lightly scratched five (5) times (with a minimal force). The surface area of any removed indicia material is measured relative to the total scratched surface. The surface measurements are based on the substrate area from which indicia material has been removed, compared to the total area of the as-formed indicia. Measurements may for example be made by use of a planimeter. For the Dry Scratch Test there is no wetting. For the Wet Scratch Test, water is sprayed on the underside (opposite the indicia-containing side) of the substrate as mist and in sufficient quantity to form a film. The scratch test is performed immediately thereafter.

The test results may be numerically rated from 1 (excellent-no loss of indicia) to 5 (very poor-complete loss of indicia). In this rating system 2 is up to about 25% loss of indicia, 3 is between about 26% and about 49% loss of indicia, and 4 is between about 50% and about 74% loss of indicia. This means that a rating of 1, 2 or 3 is acceptable from the standpoint of abrasion resistance.

Tape Test and High Adhesion Bonding

To test adhesion of the indicia to the substrate, a commercially available transparent adhesion tape (#610 marketed by 3M Company) is hand pressed over the indicia, and then hand pulled away from the indicia—first at 90 degrees to the substrate and then at 180 degrees to the substrate surface which is more severe. The tape adhesion surface is examined for color and the indicia inspected for loss of color. If either reveals significant removal of color from the indicia, the latter is deemed to have failed the test, and if there is no significant removal of color the indicia passed the tape test. A most preferred embodiment of the inventive article has "high adhesion bonding" between the substrate and the indicia, and this means the article passes the aforedescribed tape test.

Using the aforedescribed criteria, the indicia-containing substrates of Example 1 did not provide abrasion resistance. This was not an objective of these experiments as the thermoplastic film substrate was not corona-discharge treated prior to use. Based on prior art teachings, it is believed that such treatment would have improved abrasion resistance.

It has previously been stated that the substrate to which the desired indicia is bonded is preferably nonporous. For this reason, it is preferred not to use the uncoated paper side of fiber (paper) reinforced cellulosic casing as the substrate. If such casing is to be used in the practice of this invention, it is preferred to apply the indicia to the viscose coated side because the latter is relatively nonporous. This of course is not a problem with nonreinforced cellulose prepared by the viscose-xanthation process, because each side of the casing is relatively nonporous. Thermoplastic films are usually relatively nonporous.

EXAMPLE 2

In this example a brown logo type indicia-containing nonreinforced cellulosic food casing was prepared in accordance with this invention, using commercial printing equipment.

The colorant comprised a 50 wt% caramel-containing aqueous solution prepared by mixing caramel powder (Sethness type 858) in water (solution viscosity 23 seconds as measured with Zahn cup No. 2). The binder-sealant was of two types. One type comprised 20 parts zein, 72 parts isopropyl alcohol solvent and 8 parts water (all on weight basis). The viscosity of this zein binder-sealant solution was 28 seconds. The other type comprised 30 wt% clear shellac and 70 wt% isopropyl alcohol solvent. The viscosity of this shellac binder-sealant solution was 19 seconds.

The casing used in this test was regular (no peeling aid) nonreinforced cellulose casing manufactured by Viskase Corporation using the viscose-xanthation process, designated size 24 having 1.30 inch flat width. This casing was from a production lot but diverted from the production system prior to shirring.

The indicia to be printed on the casing outer wall was the star logo of ARMOUR ® Company with the letters about 5/16-inch high and the star about 5/16-inch high. The indicia repeated every 3 inches along the casing length, with all indicia positioned on the same central axis as for example illustrated in FIG. 6.

The printing apparatus used to apply the indicia was a flexographic press system as generally illustrated in FIG. 1A. The printing procedure was as previously described in connection with FIG. 1A, using separate printing heads for the caramel underlayer and the binder-sealant overlayer. The flat casing 14 fed to the colorant printing station had about 16 wt% water (bone dry basis). The caramel colorant layer portion of the indicia was dried to about 300° F. in first drier 60 and had a thickness of about 0.03 mil. The solvent of the binder-sealant portion of the indicia was evaporated in second drier 68 at 300° F. to provide a binder-sealant layer thickness of about 0.04 mil so that the total thickness of the overlaid indicia was about 0.07 mil.

It will be recognized that the moisture content of the dried indicia-containing cellulose casing 23 is affected by the casing throughput rate, and for the shellac coated indicia-containing article the relationship were as follows: at 100 fpm, 8.5–9.0% $H_2O$; 150 fpm, 9.5–10.0% $H_2O$; and 200 fpm, 10.7–11.0% $H_2O$ (all on bone dry basis). For the zein coated indicia-containing article the relationships were as follows: at 100 fpm, 8.5% $H_2O$; 150 fpm, 10.0% $H_2O$; and 200 fpm, 10–10.5% $H_2O$.

The indicia-containing cellulosic casing prepared in the aforedescribed manner was examined on the basis of the aforedescribed criteria and met all requirements. More specifically, the indicia resolution with each type of binder-sealant was excellent, and easily readable. The binder-sealant overlayer extended about ⅛ inch beyond the outer perimeter of the caramel under layer, and adhered to the cellulose substrate. The indicia abrasion resistance was not directly measured but was functionally satisfactory because none of the indicia separated during the subsequent processing steps prior to transfer. Likewise, the indicia-to-substrate bond moisture sensitivity was functionally satisfactory because despite exposure to moisture-containing environments there was no indicia separation prior to transfer to the food surface.

The aforedescribed indicia-containing cellulose casing was then shirred and compressed to a pack ratio of about 82 using commercial equipment of the standard fixed mandrel type operated at a production rate of about 1200 ft/min to produce shirred sticks. Sufficient moisture was added by the shirr spray to increase the water content to about 26 wt.%. During shirring, the stick power-twist was oriented opposite to the FAM spinning direction in accordance with the aforereferenced U.S. Pat. No. 4,649,961.

There was excessive breakage and pinholing of the casing during shirring. Further work was needed to identify commercial operating conditions for production of an indicia-containing casing with sufficient moisture in the as-dried article to avoid shirring damage and yet retain the high resolution of the indicia. A series of tests were performed for preparation of both the shellac and zein coated articles to identify optimum operating conditions, by varying the drying temperature and the casing throughput rate. That is, to provide adequate moisture for shirring without casing damage the drier temperature should be relatively low and the throughput rate should be relatively high. Conversely, to insure a dry caramel colorant layer and avoid offsetting during transfer to the food surface, the drier temperature should be relatively high and the throughput rate relatively low. For the particular commercial system used in these experiments the optimum conditions for the zein coated article was a throughput rate of 125 fpm and a drier temperature of 250° F. For the shellac coated article the optimum conditions were a throughput rate of 150 fpm and a drier temperature of 225° F. Shellac is preferred to zein as a binder-sealant for caramel colorant because it is less sensitive to water and thereby provides slightly better protection against indicia offsetting.

This Example demonstrates that the cellulosic food casing embodiment of invention article can be manufactured with commercial equipment at a commercial production rate.

This Example also demonstrates a preferred article comprising a shirring cellulosic food casing having on a surface thereof a desired indicia comprising a dry caramel underlayer and a shellac binder-sealant overlayer. The indicia was substantially completely transferable from the casing surface to the water moisturized outer surface of a food body during processing thereof in the casing as demonstrated in the following Example 3.

EXAMPLE 3

In this Example, the Example 2 brown indicia- containing shirred cellulose casings were used to produce frankfurter emulsion-containing packages having the emulsion in direct contact with the indicia.

These shirred and reverse twisted casings were stuffed with a commercially available frankfurter meat emulsion formulation comprising 50 lbs. beef chuck, 50 lbs. regular pork trim, 2¼ lbs. salt, 25 lbs. water, 1 lb. spice and 40 oz. Prague. The stuffing machine was the aforedescribed FAM type operated at about 220 fpm. casing and the stuffing horn was Teflon-coated. During stuffing the casing was deshirred and inverted through the bore of the stick so the casing turned inside out. This located the processable moisturized frankfurter emulsion in direct contact with the indicia.

This Example demonstrates that the frankfurter emulsion-cellulose casing processable food package embodiment of the invention can be prepared with commercial equipment using a commercial production rate.

This Example also demonstrates a preferred processable food package comprising a cellulosic casing filled with water moisture-containing processable food having its water moisturized outer surface in direct contact with the casing inner surface, wherein the latter is a substrate for a desired indicia comprising a water soluble dry colorant layer as for example caramel, with its bottom surface in contiguous and nondiffusible association with the casing inner surface, and a water insoluble binder-sealant layer as for example zein or shellac superimposed over and entirely enclosing the colorant layer top surface in adhering relationship. The binder-sealant perimeter extends outwardly beyond the colorant layer extremities so as to directly contact the surrounding casing inner surface in adhering relationship therewith. The binder-sealant top surface is in contiguous association with the food outer surface. The indicia is substantially completely transferable from the casing inner surface to the water moisturized food outer surface during processing thereof in the casing, as demonstrated in the following Example 4.

EXAMPLE 4

In this Example, the Example 3 frankfurter emulsion-indicia containing cellulose casing packages with caramel underlayer and either shellac or zein overlayer were used to produce frankfurters with the desired brown logo indicia on their outer surface.

The aforedescribed packages were cooked in a smoke house at 180° F. using 25% relative humidity until the internal temperature reached 160° F., then water showered for 10 minutes for cooling to about 40° F. The casings were then hand-peeled.

During hot processing, the indicia simultaneously substantially completely transferred from the casing inner surface to the moisture-containing frankfurter outer surface. This was apparent because visual inspection of the frankfurter outer surface revealed substantially complete coverage of the indicia contact area by the brown color with each binder-sealant. Moreover, the indicia definition on the frankfurter surface was very clear, although the color was somewhat less bright than the original indicia on the cellulose casing outer surface. Examination of the peeled casings revealed substantially complete transfer of the indicia from the casing surface to the frankfurter surface. There was no loss of indicia when the latter was hand-rubbed on the frankfurter surface.

In other tests with substantially identical processed packages, the casing was peeled from the frankfurter surface by a commercial-type (Apollo Ranger) peeler at speed of about 500 fpm, and the indicia remained undamaged on the frankfurter surface.

This Example demonstrates that the logo indicia-containing frankfurter edible food embodiment of the invention can be prepared with commercial equipment using a commercial production rate.

This Example also demonstrates a preferred edible food product comprising a frankfurter having on its outer surface a desired indicia of either shellac or zein binder-sealant layer bonded to the frankfurter outer surface and caramel colorant adhered to the outer surface of the binder-sealant.

EXAMPLE 5

The advantages of this invention were illustrated by comparable ARMOUR ® star indicia-cellulose casing substrate tests using caramel indicia without a binder-sealant overlayer. That is, all other materials, compositions and treatments were identical to the aforedescribed Examples 2–4.

In the stuffing test, severe bleeding and offsetting was observed with respect to the caramel-only indicia transferred to the processed frankfurter surface. This striking difference between the transferred indicia was solely attributable to the binder sealant layer.

EXAMPLE 6

In this Example, a grill mark type indicia-containing nonreinforced cellulosic food casing article was prepared and successfully shirred casing a zein-caramel-zein sandwich type indicia.

The caramel colorant aqueous mixture and the zein binder-sealant mixtures were prepared using the same mixing proportions described in Example 2, and the substrate was the same type of nonreinforced transparent cellulosic casing used in Example 2 except that carboxymethyl cellulose (a peeling aid) was applied to the external surface prior to shirring. The indicia indicia were brown grill marks about ⅛ inch wide, about 1 inch long and about 1 inch apart, as illustrated in FIG. 2. The above-described printing system used in Example 1 was also used to prepare the sandwich-type indicia, except that another binder-sealant applicator system and drier was used between unwind reel 10 and colorant application system 15a-18a (see FIG. 1A). The last applied binder-sealant system was sized to apply a second binder-sealant layer whose perimeter extended outwardly beyond the first binder-sealant and colorant layer extremities so as to directly contact the surrounding cellulosic substrate. This extension was about ⅛ inch beyond the extremities of the underlying layers.

The indicia application system was operated at two different throughput rates (150 fpm and 200 fpm) and two different drier temperatures (225° F. and 275° F.). The combination of 150 fpm and 225° F. was preferred on the basis that the indicia application system at these conditions removed the least amount of casing moisture (i.e. 11.5 wt% $H_2O$ incoming and 10.0% $H_2O$ outgoing) and there was no offsetting of the indicia through the shirring step. The latter was performed without casing damage in the same manner as described in Example 3.

This Example illustrates the preparation of the article embodiment comprising a cellulosic substrate having thereon a desired indicia comprising a water insoluble first binder-sealant layer with its bottom surface adhered to the cellulose substrate, a water soluble dry colorant layer with its under surface superimposed on the top surface of the first binder-sealant layer in adhering and nondiffusible relationship with the last-mentioned layer, and a water insoluble second binder-sealant layer superimposed over the colorant layer upper surface and extending beyond the colorant layer extremities in adhering relationship so as to entirely enclose the colorant layer. In this Example the superimposed second binder-sealant layer extended beyond the colorant layer extremities so as to directly contact the cellulose substrate. The Example also illustrates a preferred embodiment of the article wherein a peeling aid coating on the cellulose substrate is provided beneath the first binder-sealant layer bottom surface.

EXAMPLE 7

The shirred zein sandwich type indicia-containing cellulose casing article of Example 6 was reverse-stuffed with frankfurter emulsion, processed and peeled, all in the same manner as described in Example 4.

Inspection of the grill mark indicia-containing frankfurters revealed that a slight degree of offsetting had occurred even on the frankfurters processed in the casing where offsetting had not occurred on the as-printed cellulose casing substrate. The offsetting was previously observed on the shirred sticks, so was due to moisture penetration from the shirring solution. This slight offsetting could probably be eliminated by adjusting the indicia application process conditions, i.e. lower throughput rate and/or higher drying temperature.

This Example illustrates a processable food package embodiment of the invention including a cellulosic casing filled with water moisture-containing processable food having its water moisturized outer surface in direct contact with the casing inner surface. The latter is a substrate for a desired indicia comprising a water insoluble first binder-sealant layer with its bottom surface adhered to the casing inner surface, a water soluble dry colorant layer with its under surface superimposed on the top surface of the first binder-sealant in adhering and nondiffusible relationship therewith, and a water insoluble second binder-sealant layer superimposed over and entirely enclosing the colorant layer upper surface in adhering relationship so as to entirely enclose the colorant layer. At least one of the first and second binder-sealant perimeters outwardly extends beyond the colorant extremities so as to directly contact the surrounding casing inner surface in adhering relationship therewith.

Example 7 also illustrates a method for making an indicia-containing food product according to this invention, employing a sandwich-type indicia. A casing article is provided having a plasticized flexible inner surface with an indicia comprising a water insoluble first binder-sealant layer having its bottom surface adhered to the casing inner surface in nondiffusible association therewith. A water soluble dry colorant layer is superimposed with its under surface on the top surface of the first binder-sealant layer in adhering and nondiffusible relationship therewith. A water insoluble second binder-sealant layer is superimposed over the colorant upper surface and extends beyond the colorant layer extremities in adhering relationship so as to entirely enclose the colorant layer. At least one of the first and second binder-sealant perimeters extends outwardly beyond the colorant extremities so as to directly contact the surrounding casing inner surface in adhering relationship. The casing is filled with water moisturized processable food such that the latter's outer surface is in direct contact with the second binder-sealant layer. The food-containing casing is processed at elevated temperature to cook the food and simultaneously substantially completely transfer the first binder-sealant, colorant, second binder-sealant sandwich indicia from the casing inner surface to the water moisturized processed food outer surface. The casing is peeled from the indicia-containing processed food outer surface, yielding the food product.

This Example also illustrates an edible food product embodiment comprising a processed food body having on its outer surface a desired indicia sandwich of a water insoluble first binder-sealant layer, a water soluble colorant layer and a water insoluble second binder-sealant layer. The top surface of the second binder-sealant layer is adhered to the food body outer surface, the upper surface of the colorant layer is adhered to the second binder-sealant layer bottom surface, and the top surface of the first binder-sealant layer is adhered to the colorant layer under surface.

EXAMPLE 8

In this Example, a grill mark type indicia-containing nonreinforced cellulosic food casing article was prepared and successfully shirred, using a shellac-caramel-shellac sandwich type indicia.

The caramel colorant aqueous mixture was prepared using the same proportions described in Example 2. The binder-sealant mixture comprised 23% shellac and 77% isopropyl alcohol solvent, with a viscosity of 10 seconds. The substrate was the same type of nonreinforced cellulosic casing with a CMC peeling aid coating on the outer surface, as used in Examples 2 and 6. The indicia were the same brown grill marks and the shellac-containing sandwich indicia was formed on the casing outer surface in the same manner as the zein-containing sandwich indicia in Example 6, using the same equipment.

The shellac indicia-forming processing conditions were also varied in the same manner as the zein conditions, i.e. at 150 and 200 fpm throughputs, with 225° and 275° F. drier temperatures. Typical moisture contents for the cellulose casing were 14.1 wt% $H_2O$ before and 10.7% $H_2O$ after indicia formation at 200 fpm throughput and 225° F. drying. The shellac-containing sandwich indicia type casing article was shirred in the same manner as the zein-containing sandwich indicia type casing article, and there was no casing damage nor offsetting.

EXAMPLE 9

The shirred shellac sandwich type indicia-containing cellulose casing article of Example 8 was reverse-stuffed with frankfurter emulsion, processed and peeled, all in the same manner as described in Example 4.

Inspection of the shellac sandwich grill mark indicia-containing frankfurters revealed that even less offsetting had occurred than with the zein sandwich grill marked frankfurters of Example 7.

Under equivalent manufacturing conditions, it appears that the sandwich type indicia embodiment has slightly less offsetting on the food product surface than the corresponding colorant underlayer binder-sealant overlayer indicia embodiment of the invention. This is probably because the first binder-sealant layer (separating the substrate and the colorant layer of the sandwich indicia) provides further protection against fluid movement into and out of the colorant layer.

While this invention has been described with reference to certain specific embodiments, it will be recognized by those skilled in this art that many variations are possible without deporting from the scope and spirit of the invention.

What is claimed is:

1. A method for making an indicia-containing food product comprising the steps of:
   a) providing a casing article having a plasticized flexible inner surface and a desired indicia comprising a water soluble dry colorant layer with its bottom surface in nondiffusible association with said casing inner surface and a water insoluble binder-sealant superimposed over and entirely enclosing the colorant top surface in adhering relationship, the binder-sealant perimeter outwardly extending beyond the colorant layer extremities so as to directly contact the surrounding casing inner surface in adhering relationship;
   b) filling said casing with water moisturized processable food such that the water moisturized food outer surface is in direct contact with said binder-sealant on the casing inner surface;
   c) processing the food-containing casing at elevated temperature to cook said food and simultaneously substantially completely transfer the binder-sealant covered colorant indicia from said casing inner surface to the water moisturized processed food outer surface; and
   d) peeling the casing from the indicia-containing processed food outer surface.

2. A method according to claim 1 wherein said casing is cellulosic.

3. A method according to claim 1 wherein said casing is a thermoplastic film.

4. A method for making an indicia-containing food product comprising the steps of:
   a) providing a cellulosic casing article having a plasticized flexible inner surface and a desired indicia comprising a water soluble dry colorant layer with its bottom surface in contiguous and nondiffusible association with said cellulosic casing inner surface and a water insoluble binder-sealant superimposed over and entirely enclosing the colorant top surface in adhering relationship, the binder-sealant perimeter outwardly extending beyond the colorant layer extremities so as to directly contact the surrounding casing inner surface in adhering relationship;
   b) filling said casing with water moisturized processable food such that the water moisturized food outer surface is in direct contact with said binder-sealant on the casing inner surface;
   c) processing the food-containing casing at elevated temperature to cook said food and simultaneously substantially completely transfer the binder-sealant covered colorant indicia from said casing inner surface to the water moisturized processed food outer surface; and
   d) peeling the casing from the indicia-containing processed food outer surface.

5. A method according to claim 4 including the steps of adhering said indicia to the casing article outer surface and thereafter inverting said casing article to position said indicia on said inner surface as said substrate.

6. A method according to claim 2 wherein said processed food is meat.

7. A method according to claim 2 wherein said processed food is poultry.

8. A method according to claim 3 wherein said processed food is carbohydrate.

9. A method according to claim 4 wherein said processed food is cheese.

10. A method according to claim 5 wherein said colorant is caramel.

11. A method according to claim 10 wherein said binder-sealant is shellac.

12. A method according to claim 10 wherein said binder-sealant is zein.

13. A method for making an indicia-containing food product comprising the steps of:
   a) providing a thermoplastic film casing article having a flexible inner surface and a desired indicia comprising a water soluble dry colorant layer with its bottom surface in contiguous and nondiffusible association with said thermoplastic film casing inner surface and a water insoluble binder-sealant superimposed over and entirely enclosing the colorant top surface in adhering relationship, the binder-sealant perimeter outwardly extending beyond the colorant layer extremities so as to directly contact the surrounding casing inner surface in adhering relationship;
   b) filling said film casing with water moisturized processable food such that the water moisturized food outer surface is in direct contact with said binder-sealant on the casing inner surface;

c) processing the food-containing film casing at elevated temperature to cook said food and simultaneously substantially completely transfer the binder-sealant covered colorant indicia from said casing inner surface to the water moisturized processed food outer surface; and d) peeling the film casing from the indicia-containing processed food outer surface.

14. A method for making an indicia-containing food product comprising the steps of:

a) providing a casing article having a plasticized flexible inner surface with an indicia comprising a first binder-sealant layer having its bottom surface adhered to the casing inner surface in nondiffusible association therewith, a water soluble dry colorant layer with its under surface superimposed on the top surface of said first binder-sealant layer in adhering and nondiffusible relationship therewith, and a second binder-sealant layer superimposed over the colorant upper surface and extending beyond the colorant layer extremities in adhering relationship so as to entirely enclose said colorant layer, with at least one of said first and second binder-sealant perimeters outwardly extending beyond the colorant extremities so as to directly contact the surrounding casing inner surface in adhering relationship, said first and second binder-sealants having melting points above about 100° F. and being water insoluble;

b) filling said casing with water moisturized processable food such that the water moisturized food outer surface is in direct contact with said second binder-sealant layer;

c) processing the food-containing casing at elevated temperature to cook said food and simultaneously substantially completely transfer the first binder-sealant, colorant, second binder-sealant sandwich indicia from said casing inner surface to the water moisturized processed food outer surface; and d) peeling the casing from the indicia-containing processed food outer surface.

15. A method according to claim 14 wherein said casing is cellulosic.

16. A method according to claim 14 wherein said casing is a thermoplastic film.

17. A method for making an indicia-containing food product comprising the steps of:

a) providing a cellulosic casing article having a plasticized flexible inner surface with an indicia comprising a first binder-sealant layer having its bottom surface adhered to the cellulosic casing inner surface in nondiffusible association therewith, a water soluble dry colorant layer with its under surface superimposed on the top surface of said first binder-sealant layer in adhering and nondiffusible relationship therewith, and a second binder-sealant layer superimposed over the colorant upper surface and extending beyond the colorant layer extremities in adhering relationship so as to entirely enclose said colorant layer, with at least one of said first and second binder-sealant perimeters outwardly extending beyond the colorant extremities so as to directly contact the surrounding casing inner surface in adhering relationship, said first and second binder-sealants having melting points above about 100° F. and being water insoluble;

b) filling said casing with water moisturized processable food such that the water moisturized food outer surface is in direct contact with said second binder-sealant;

c) processing the food-containing casing at elevated temperature to cook said food and simultaneously substantially completely transfer the first binder-sealant, colorant, second binder-sealant sandwich indicia from said casing inner surface to the water moisturized processed food outer surface; and d) peeling the casing from the indicia-containing processed food outer surface 18. A method according to claim 17 including the steps of bonding said indicia to the casing article outer surface and thereafter inverting said casing article to position said indicia on said inner surface as said substrate.

19. A method according to claim 17 wherein said processed food is meat.

20. A method according to claim 17 wherein said processed food is poultry.

21. A method according to claim 17 wherein said processed food is carbohydrate.

22. A method according to claim 17 wherein said processed food is cheese.

23. A method according to claim 17 wherein said colorant is caramel.

24. A method according to claim 17 wherein at least one of said first and second binder-sealants is zein.

25. A method according to claim 17 wherein at least one of said binder-sealants is shellac.

26. A method according to claim 17 wherein said indicia is spaced grill-marks.

27. A method according to claim 17 wherein said indicia is a logo.

* * * * *